United States Patent
Liu et al.

(10) Patent No.: US 10,812,221 B2
(45) Date of Patent: Oct. 20, 2020

(54) CHANNEL SIGNAL DECODING WITH UNKNOWN STATION IDENTIFIER INFORMATION USING POWER DETECTION AND REDUNDANCY REDUCTION-BASED ERROR CHECKING

(71) Applicant: Hong Kong Applied Science and Technology Research Institute Co., Ltd., Shatin, New Territories (HK)

(72) Inventors: Xiangyu Liu, Shenzhen (CN); Lu Yang, Lam Tin (HK); Eddy Chiu, Kowloon (HK); Chenggang Lyu, Shenzhen (CN); Jun Zhu, Shatin (HK); Ching Hong Chris Leung, Hong Kong (CN); Man Wai Victor Kwan, Hong Kong (CN); Kong Chau Eric Tsang, Kowloon (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 24 days.

(21) Appl. No.: 16/276,003

(22) Filed: Feb. 14, 2019

(65) Prior Publication Data

US 2020/0266925 A1    Aug. 20, 2020

(51) Int. Cl.
*H03M 13/00* (2006.01)
*H04L 1/00* (2006.01)
(Continued)

(52) U.S. Cl.
CPC .......... *H04L 1/0045* (2013.01); *H04L 1/0058* (2013.01); *H04W 8/18* (2013.01); *H04W 72/042* (2013.01)

(58) Field of Classification Search
None
See application file for complete search history.

(56) References Cited

U.S. PATENT DOCUMENTS

2018/0331693 A1* 11/2018 Lou .................. H03M 13/6362
2018/0351698 A1* 12/2018 Lin ....................... H04L 1/0041

FOREIGN PATENT DOCUMENTS

CN    103701564 A    4/2014
CN    104683069 A    6/2015
(Continued)

OTHER PUBLICATIONS

International Search Report and Written Opinion issued for PCT Application No. PCT/CN2019/075277, dated Oct. 24, 2019, 9 pages.

*Primary Examiner* — Guerrier Merant
(74) *Attorney, Agent, or Firm* — Norton Rose Fulbright US LLP

(57) ABSTRACT

Systems and methods which provide for accurate decoding of a received channel signal when station identifier information is unknown. Embodiments accurately decode a physical downlink control channel (PDCCH), such as to obtain downlink control information (DCI), without knowing radio network temporary identifier (RNTI) information. An unknown station identifier information (USII) of embodiments uses redundancy reduction-based error checking (performing error checking between data decoded from a candidate control channel data block containing redundant data and a portion of that candidate control channel data block containing redundancy reduced data) for implementing decoding when station identifier information is unknown. Embodiments of a USII decoder may use a power detection technique for identifying candidate control channel data blocks used in redundancy reduction-based error checking operation.

24 Claims, 9 Drawing Sheets

(51) Int. Cl.
*H04W 8/18* (2009.01)
*H04W 72/04* (2009.01)

(56) References Cited

FOREIGN PATENT DOCUMENTS

| | | |
|---|---|---|
| CN | 105490779 A | 4/2016 |
| CN | 105680996 A | 6/2016 |
| CN | 107911200 A | 4/2018 |

\* cited by examiner

CHANNEL SIGNAL DECODING WITH UNKNOWN STATION IDENTIFIER INFORMATION USING POWER DETECTION AND REDUNDANCY REDUCTION-BASED ERROR CHECKING

TECHNICAL FIELD

The present invention relates generally to wireless communication and, more specifically, to decoding signals of a channel such as a physical downlink control channel (PDCCH) without station identifier information such as radio network temporary identifier (RNTI) information using power detection and redundancy reduction-based error checking.

BACKGROUND OF THE INVENTION

Data communications are widely relied upon in today's society for a variety of purposes, such as messaging between individuals, broadcast communications, controlling machinery, networking of processor-based systems, etc. The data may be communicated through various channels, including wireline, wireless, and optical channels, and may be subject to various sources of noise, interference, and/or other signal degradation. In cellular radio systems, for example, wireless transmission is used to convey bits of information between base stations (BSs) and handsets and/or other user equipment (UE). Various coordination and control functions must be implemented in order to facilitate high quality, shared use of the cellular network resources by a number of UEs.

In fourth generation (4G) LTE cellular network systems, for example, the physical downlink control channel (PDCCH) is a physical channel that carries downlink control information (DCI) used in controlling and coordinating communications between UEs and BSs. DCI messages carried by the PDCCH include transmit uplink or downlink scheduling information from a BS to target UEs, so that a UE can identify, the resources allocated for it to receive or transmit data. The DCI may be transmitted within the PDCCH in one of a number of DCI formats (e.g., DCI formats 1, 1A, 1B, 1C, 1D, 2, 2A, 2B, 2C, etc.). Moreover, each PDCCH is transmitted on an aggregation of one or several consecutive control channel elements (CCEs) in the control region. The number of consecutive CCEs transmitting PDCCH is called the aggregation level (AL), wherein the various ALs (e.g., ALs of 1, 2, 4, and 8 CCEs per PDCCH) may be used to provide adequate bandwidth for carrying the information of a particular DCI, to provide redundancy for a noisy channel, etc.

In each downlink subframe, there can be multiple PDCCHs. In typical operation, a UE will find the particular PDCCH for it through decoding PDCCH candidates with a radio network temporary identifier (RNTI), also be referred to as a UE identifier, assigned to the UE. A RNTI may, for example, be assigned by the BS Which the UE is connected to, wherein the BS transmits the assigned RNTI to the UE before the UE performs PDCCH decoding.

A UE may determine the particular CCEs of candidate PDCCHs to attempt decoding DCI from using an appropriate RNTI assigned to the UE (e.g., calculating the starting CCE index using a formula based on RNTI, subframe number, number of CCEs, and the aggregation level). The UE performs blind decoding of candidate PDCCHs because the UE does not have information regarding the AL or DCI format used by the BS. Such blind decoding, however, requires RNTI information.

In some scenarios it may be desirable to obtain DCI information for a particular UE without knowing the corresponding RNTI information assigned to the UE. However, the accuracy using existing PDCCH decoding without RNTI information is relatively low.

United States patent application publication U.S. 2018/0035411 A1, the disclosure of which is incorporated herein by reference, describes an existing technique for PDCCH decoding with unknown RNTI. The PDCCH decoding technique in U.S. 2018/0035411 A1 provides a one-step reencode method, as shown in FIG. 1, wherein a strict matching of reencoded data to hard bit data is used to determine RNTI information and obtain DCI associated with that RNTI. Power level detection with respect to individual resource elements (REs) of a downlink subframe is performed to group continuous REs for DCI extraction, as shown in block 101. Thereafter, decoded information bits, including soft bit data and convolutional decoded data, are acquired from each of the groups of continuous REs, as shown in block 102. Having obtained soft bit data and convolutional decoded data, the one-step reencode method of block 103 is performed wherein the convolutional decided data is reencoded and hard decisions are performed on the soft bit data to provide hard bits. The reencoded data and hard bit data are compared according to the one-step reencode method, wherein if the reencoded data is exactly equal to the hard bit data it is determined that the DCI in the convolutional decoded data is correct. Thereafter, check bits are obtained from the convolutional decoded data and the unknown RNTI obtained from the check bits (i.e., exclusive or (XOR) operation with respect to two separately determined sets of check bits). The condition of the one-step reencode method that the reencoded data must exactly match the hart bit data is a very strict condition which typically requires that the channel be very clear in order for this technique to obtain RNTI.

China patent CN 105680996 A, the disclosure of which is incorporated herein by reference, also describes an existing technique for PDCCH decoding with unknown RNTI. The technique of CN 105680996 A is essentially a relaxed version of the one-step reencode method of US 2018/0035411 A1 discussed above, as shown in FIG. 2. That is, the PDCCH decoding technique in CN 105680996 A provides a one-step reencode method wherein a strict matching of reencoded data to hard bit data not required to determine RNTI information and obtain DCI associated with that RNTI, but rather error bit threshold is used for this purpose. In accordance with the relaxed one-step reencode method of CN 105680996 A, power level detection with respect to individual resource elements (REs) of a downlink subframe is performed to group continuous REs for DCI extraction, as shown in block 201. Thereafter, decoded information bits, including soft bit data and convolutional decoded data, are acquired from each of the groups of continuous REs, as shown in block 202. Having obtained soft bit data and convolutional decoded data, the relaxed one-step reencode method of block 203 is performed wherein the convolutional decided data is reencoded and hard decisions are performed on the soft bit data to provide hard bits. A number of error bits in each CCE is determined for each blind detection, wherein if the number of error bits is less than a threshold value it is determined that the DCI in the convolutional decoded data is correct. Thereafter, check bits are obtained from the convolutional decoded data and the unknown RNTI obtained from the check bits (i.e., XOR operation with respect to two separately determined sets of check bits). Although the condition for determining DCI is correct is relaxed as compared to that of U.S. 2018/0035411 A1, the obtained RNTI and DCI still may not be correct (e.g., the relaxed one-step reencode method is particularly susceptible to errors in detecting DCI in low signal to noise ratio (SNR) conditions). Such incorrect decoding of the RNTI signal can lead to loss of the information sent to the UE from its BS, for example.

BRIEF SUMMARY OF THE INVENTION

The present invention is directed to systems and methods which provide for accurate decoding of a received channel signal when station identifier information is unknown (referred to herein as unknown station identifier information (USII) decoding). Embodiments of the invention may, for example, accurately decode a physical downlink control channel (PDCCH), such as to obtain downlink control information (DCI), without knowing radio network temporary identifier (RNTI) information.

A USII decoder in accordance with concepts of the present invention uses redundancy reduction-based error checking for implementing decoding when station identifier information is unknown. Redundancy reduction-based error checking implemented according to embodiments of the invention performs error checking between information derived from data decoded from a candidate control channel data block containing redundant data and information derived from data decoded from a portion of that candidate control channel data block containing redundancy reduced data. For example, redundancy reduction-based error checking may operate to perform error checking between station identifier information derived from soft bit data decoded from a number of consecutive CCEs of a first AL (e.g., 8 CCEs of AL=8, 4 CCEs of AL=4, or 2 CCEs of AL=2) comprising a candidate PDCCH and station identifier information derived from soft bit data decoded from one or more consecutive CCEs (e.g., 4 CCEs, 2 CCEs, or 1 CCE) forming a redundancy reduced portion of the candidate PDCCH (e.g., error checking RNTI obtained from AL=N consecutive CCEs and AL=N/2 consecutive CCEs). In operation according to embodiments, the data used in redundancy reduction-based error checking comprises putative radio network temporary identifiers (RNTIs), wherein a putative RNTI obtained from a candidate control channel data block and a putative RNTI obtained from a redundancy reduced portion of the candidate control channel data block are compared to determine if the candidate PDCCH is correctly decoded.

Embodiments of a USII decoder may use a power detection technique for identifying candidate control channel data blocks used in redundancy reduction-based error checking operation. For example, power detection may be used to identify individual CCEs carrying information bits. In operation according to embodiments, a CCE may be considered as carrying information bits if the CCE average power meets or exceeds a predetermined threshold value. Consecutive instances of individual CCEs identified as carrying information bits may be grouped for determining candidate control channel data blocks used in the redundancy reduction-based error checking of embodiments.

USII decoders of embodiments of the invention, implementing redundancy reduction-based error checking for decoding data when station identifier information is unknown provide a high probability of correct detection of information (e.g., ≥98% probability of correct decoded data) with a low probability of false alarms (e.g., ≤0.5% probability of determining that correctly decoded data is incorrect) and a low probability of misdetection (e.g., ≤2% probability of determining that incorrectly decoded data is correct), even in low SNR conditions (e.g., SNR=10 dB). Operation of such USII decoders provides an improvement over blind decoding, which requires RNTI information for practical implementation. Likewise, operation of such USII decoders provides an improvement over one-step reencode, which requires very strict conditions for correct decoding detection, and relaxed one-step reencode, which is susceptible to errors in correct decoding detection in low SNR conditions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1:
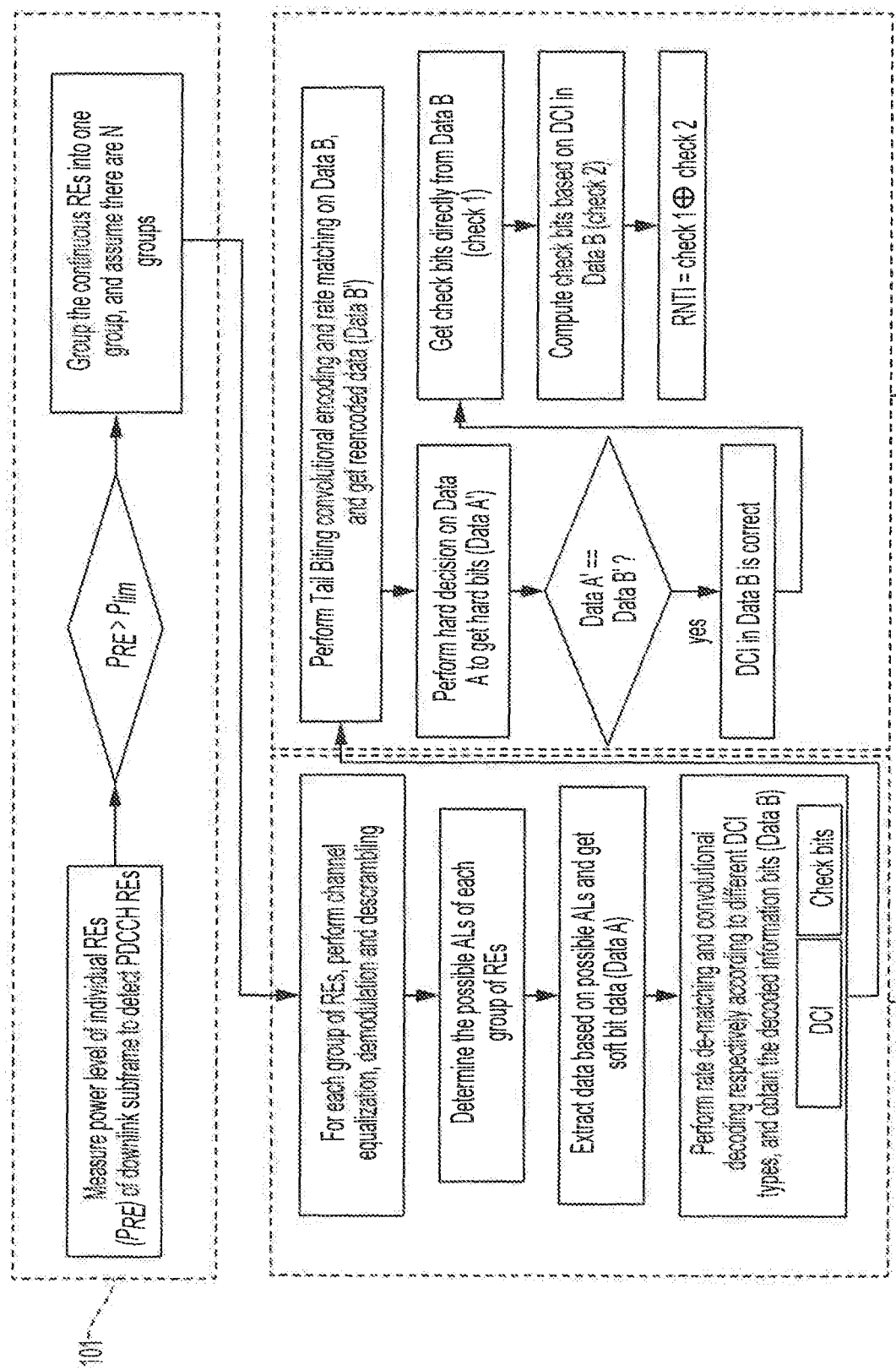
FIG. 1 shows a one-step reencode method using strict matching of reencoded data to hard bit data to determine RNTI information and obtain DCI associated with that RNTI.
Figure 2:
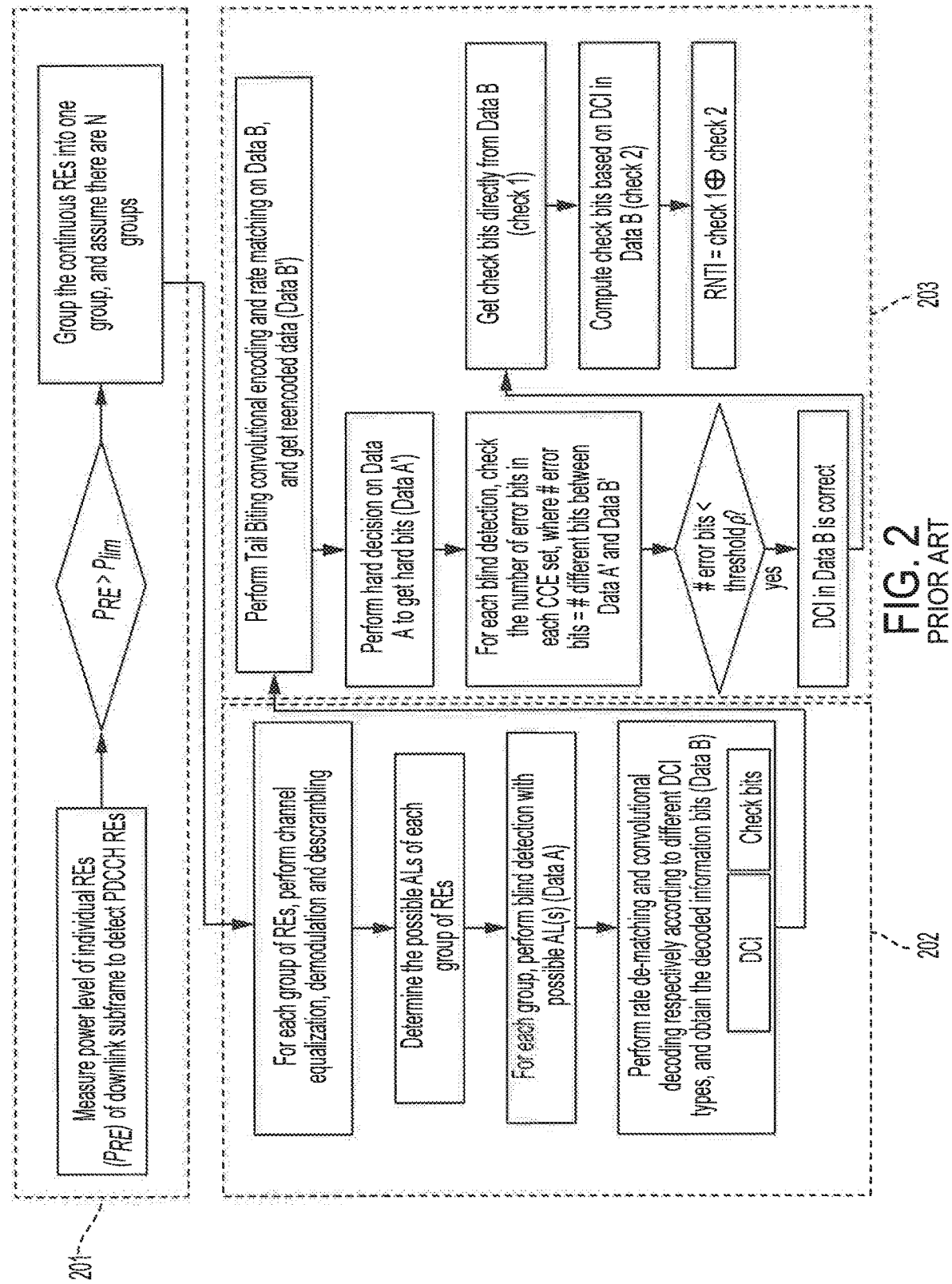
FIG. 2 shows a relaxed version of the one-step reencode method of FIG. 1.
Figure 3:
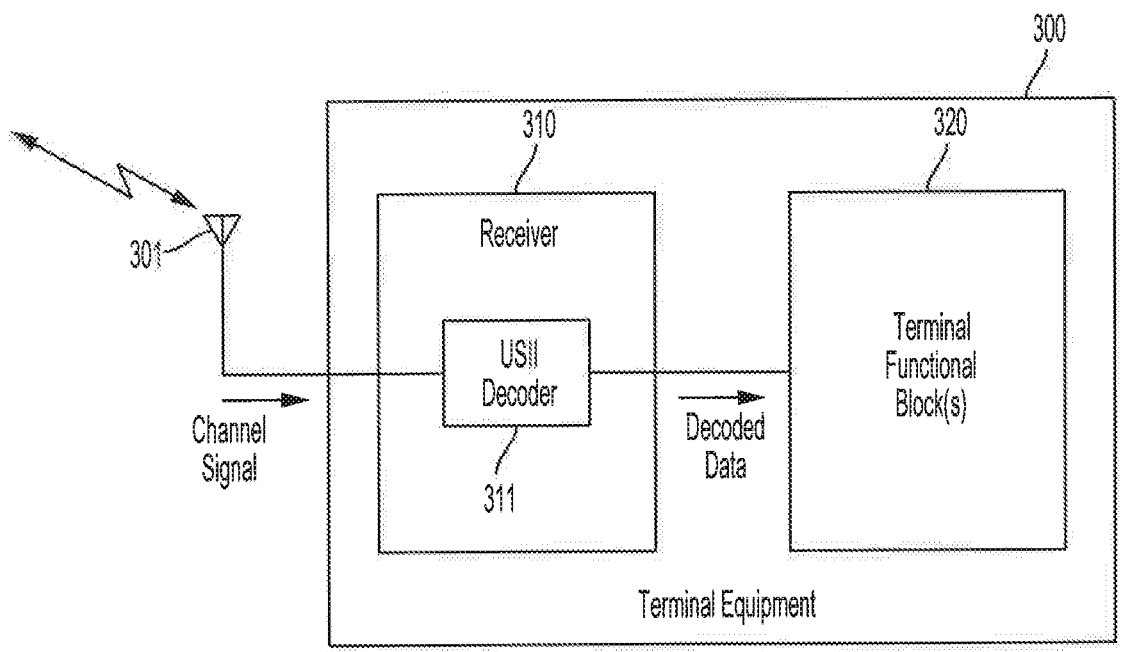
FIG. 3 shows a USII decoder of embodiments of the present invention.

FIG. 3 shows an exemplary embodiment of an unknown station identifier information (USII) decoder implementation in accordance with concepts of the present invention. In the illustrated embodiment, terminal equipment (TE) 300 comprises communication equipment, such as a handset device, UE, network node, network sniffer, vehicle-to-everything (V2X) unit, etc., operating in a wireless network, such as a cellular radio network (e.g. 4G cellular network system). TE 300 is shown as including a plurality of functional blocks for performing various functions thereof. For example, TE 300 of the illustrated embodiment includes receiver 310 for providing received signal processing and to provide received signals and/or information extracted therefrom to terminal functional block(s) 320, such as may comprise various data sink, control element, user interface, etc. Although receiver 310 of TE 300 is described as providing received signal processing, it should be appreciated that this functional block may be implemented as a transceiver providing both transmitted and received signal processing. Irrespective of the particular configuration of receiver 310, embodiments include USII decoder 311 disposed in association with the receiver for facilitating accurate decoding of a received channel signal when station identifier information is unknown.

Although USII decoder 311 of the illustrated embodiment is shown as being deployed as part of receiver 310 (e.g., comprising a portion of the receiver control and logic circuits), there is no limitation to such a deployment configuration according to the concepts of the present invention. For example, USII decoder 311 of embodiments may be deployed as a functional block of TE 300 that is distinct from, but connected to, receiver 310 (e.g. USII decoder 311 may comprise a portion of the TE controller (not shown) logic circuits). USII decoder 311 of embodiments may, for example, be implemented using logic circuits and/or executable code segments operable perform functions as described herein. For example, code segments of USII decoder 311 may be stored in one or more memories (e.g., random access memory (RAM), read only memory (ROM), flash memory, magnetic memory, optical memory, and/or the like) suitable for storing one or more instruction sets (e.g., application software, firmware, operating system, applets, and/or the like), data (e.g., configuration parameters, operating parameters, collected data, processed data, and/or the like), etc. The one or more memories may comprise processor-readable memories for use with respect to one or more processors (e.g., CORE processor available from Intel Corporation, RADEON processor available from Advanced Micro Devices, Inc., POWERPC processor available from International Business Machines, advanced reduced instruction set computer machine (ARM) central processing unit (CPU) core, and/or the like) operable to execute code segments of USII decoder 311 and/or to utilize data provided thereby to perform functions of USII decoding described herein. Additionally or alternatively, USII decoder 311 may comprise one or more special purpose processor (e.g., application specific integrated circuit (ASIC), field programmable gate array (FPGA), graphics processing unit (GPU), and/or the like) configured to perform functions of USII decoding described herein.

As described in further detail below, USII decoder 311 of embodiments is configured to implement redundancy reduction-based error checking for decoding received channel signals when station identifier information is unknown. For example, USII decoder 311 may operate to accurately decode a physical downlink control channel (PDCCH), such as to obtain downlink control information (DCI), without knowing radio network temporary identifier (RNTI) information, using redundancy reduction-based error checking in accordance with concepts herein. USII decoder 311 may use power detection for identifying candidate control channel data blocks used in the redundancy reduction-based error checking operation. For example, power detection may be used to identify individual control channel elements (CCEs) carrying information bits of a PDCCH.

Examples are described herein with reference to decoding a PDCCH to obtain DCI to provide specific instances to aid in understanding concepts of the present invention. It should be appreciated, however, that the concepts of the present invention are applicable to other received signals and may be used to obtain various information therefrom.

Figure 4A:
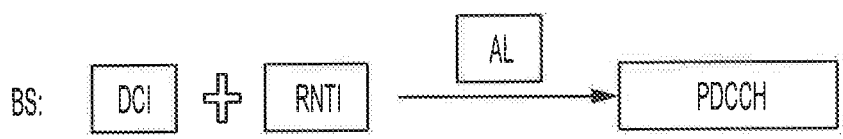
FIGS. 4A and 4B show graphical representations of coding and decoding of PDCCH.

In operation of fourth generation (4G) LTE cellular network systems the PDCCH is a physical channel used to carry downlink control information (DCI) for controlling and coordinating communications between UEs and BSs. DCI may be transmitted within the PDCCH in one of a number of DCI formats (e.g., DCI formats 1, 1A, 1B, 1C, 1D, 2, 2A, 2B, 2C, etc.) and each PDCCH is transmitted on an aggregation of one or several consecutive CCEs (1 CCE=36 resource elements (REs)=72 bits) in the control region, wherein various aggregation levels (ALs) (e.g., ALs of 1, 2, 4, and 8 CCEs per PDCCH) may be used (e.g., AL$\in\{1,2,4,8\}$). A PDCCH consisting of n consecutive CCEs may only start on a CCE fulfilling i mod n=0, where i is the CCE number. In each downlink subframe, there can be multiple PDCCHs. The PDCCH for a particular UE may be designated by a radio network temporary identifier (RNTI) assigned to the UE. Accordingly, a 4G cellular network base station (BS) operates to transmit a PDCCH for a particular UE comprising a combination of DCI and corresponding RNTI information in a selected AL of CCEs, as shown in FIG. 4A.

Figure 4B:
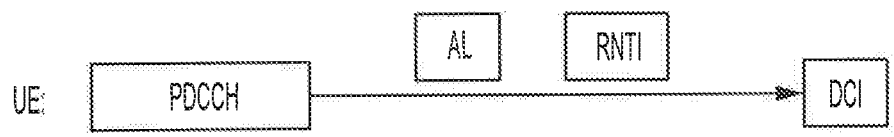

A UE in a 4G cellular network will find the particular PDCCH for it through decoding PDCCH candidates with the RNTI assigned to the UE (e.g., the BS transmits the assigned RNTI to the UE before the UE performs PDCCH decoding). In operation, the UE decodes a candidate PDCCH using AL and RNTI information to obtain DCI, as shown in FIG. 4B. Accordingly, in order for the UE to decode PDCCH according to typical operation, the UE needs information regarding the CCEs for each candidate PDCCH, AL, and RNTI.

There may, however, be scenarios in which a received channel signal, such as that of the above described PDCCH, is to be decoded without knowing the corresponding station identifier information (e.g., RNTI). For example, various TEs, such as network sniffers, V2X units, etc., may need to scan radio communications of unknown UEs, and thus the RNTI for the UE may be unknown.

Figure 5:
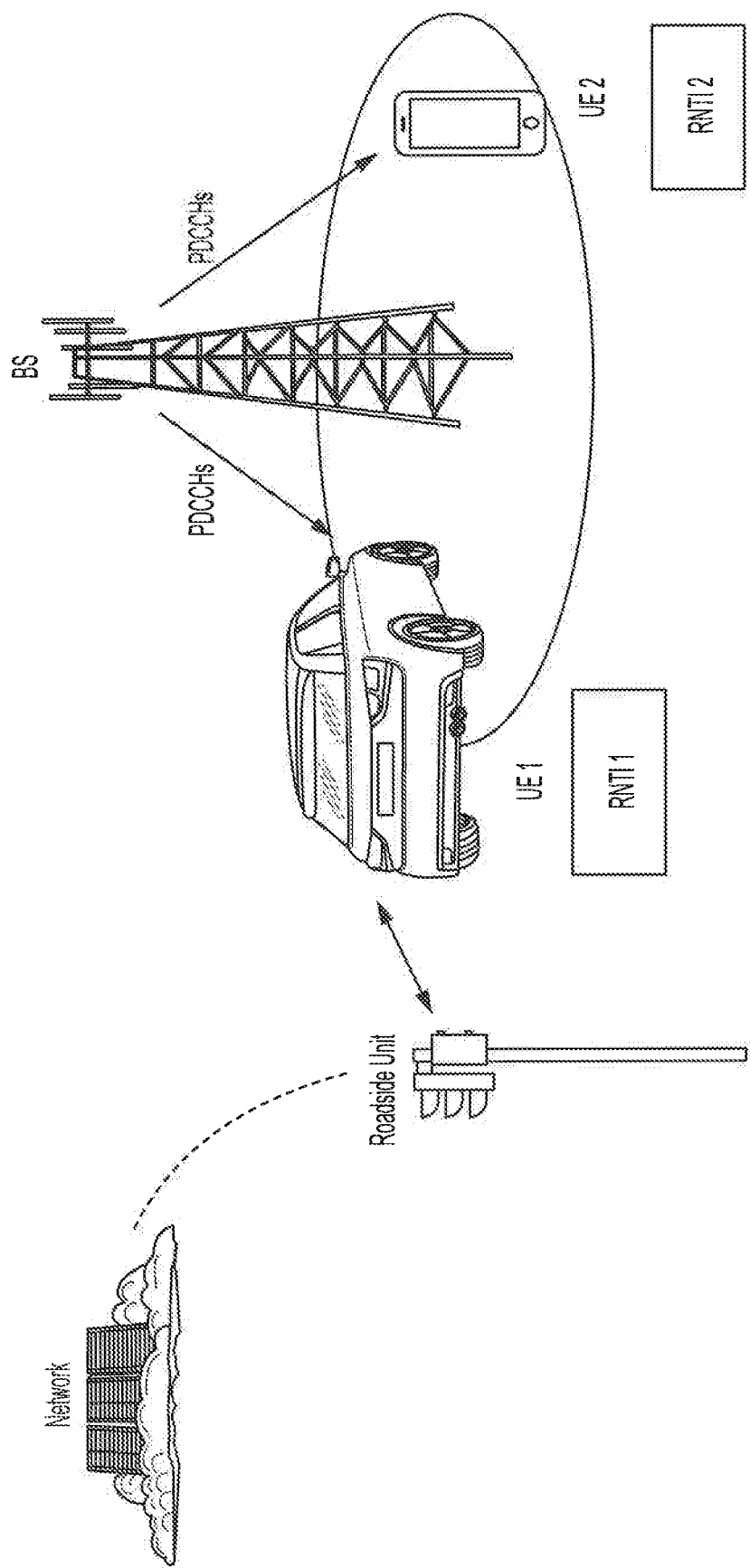
FIG. 5 shows an example scenario in which decoding of a received channel signal when station identifier information is unknown may be desired.

As a specific example, it may be useful in some V2X applications or security applications to detect UEs by their assignment or use of communication resources, without knowing their RNTI information. This exemplary scenario is illustrated in FIG. 5 for a V2X application. In particular, FIG. 5 shows a portion of a 4G cellular network in which a BS is serving UE 1 and UE 2, wherein RNTI 1 is assigned to UE 1 for use with respect to its PDCCHs transmitted by the BS and RNTI 2 is assigned to UE 2 for use with respect to its PDCCHs transmitted by the BS. It should be appreciated that UE 1 in the illustrated example may comprise a handset being operated in the vehicle shown, may comprise a system of the vehicle shown, etc. In operation of the V2X system, various roadside units (one of which is shown) may detect UEs from any networks (e.g., UEs of the 4G cellular network shown) passing nearby and report their presence and/or other information to a V2X network server (one of which is shown). The V2X roadside unit may, for example, decode PDCCHs for nearby UEs to obtain information regarding those UEs. However, the RNTI of UE 1 (shown as being disposed nearby to the V2X roadside unit in the example) is not known to the roadside unit, thus making decoding of the PDCCHs difficult if not impossible using prior techniques.

A TE, such as the V2X roadside unit of FIG. 5, may attempt to perform blind decoding of candidate PDCCHs. However, if conventional PDCCH blind decoding techniques for the RNTI unknown scenario are used, the CCEs for each PDCCH candidate cannot be calculated without RNTI. If blind decoding (e.g., calculating CCEs for PDCCH candidate based on possible RNTI and possible AL) is attempted for all the possible RNTIs (e.g., 1 to 65,535 or RNTI∈[1,65535]), the number of blind tries will be very large (i.e., too large to be practicably implemented by the computing resources of a TE and/or within the time needed to provide satisfactory decoding operation). Even if blind decoding with possible RNTI(s) could be performed and soft bit data extracted for the possible ALs, the correctness of the RNTI and obtained DCI information cannot be determined because both the putative decoded DCI and RNTI may be incorrect (e.g., rate de-matching and convolutional decoding according to possible DCI formats may be performed with respect to extracted soft bit data to obtain DCI bits, cyclic redundancy check (CRC) performed on the obtained DCI bits, and the CRC compared to the RNTI using XOR comparison logic to determine whether the putative decoded DCI is correct). Use of an incorrect RNTI by a TE in decoding a PDCCH results in all of the DCI information sent to the UE from its BS being lost to the TE (e.g., the V2X roadside unit is unable to obtain information regarding the nearby UE).

Figure 6A:
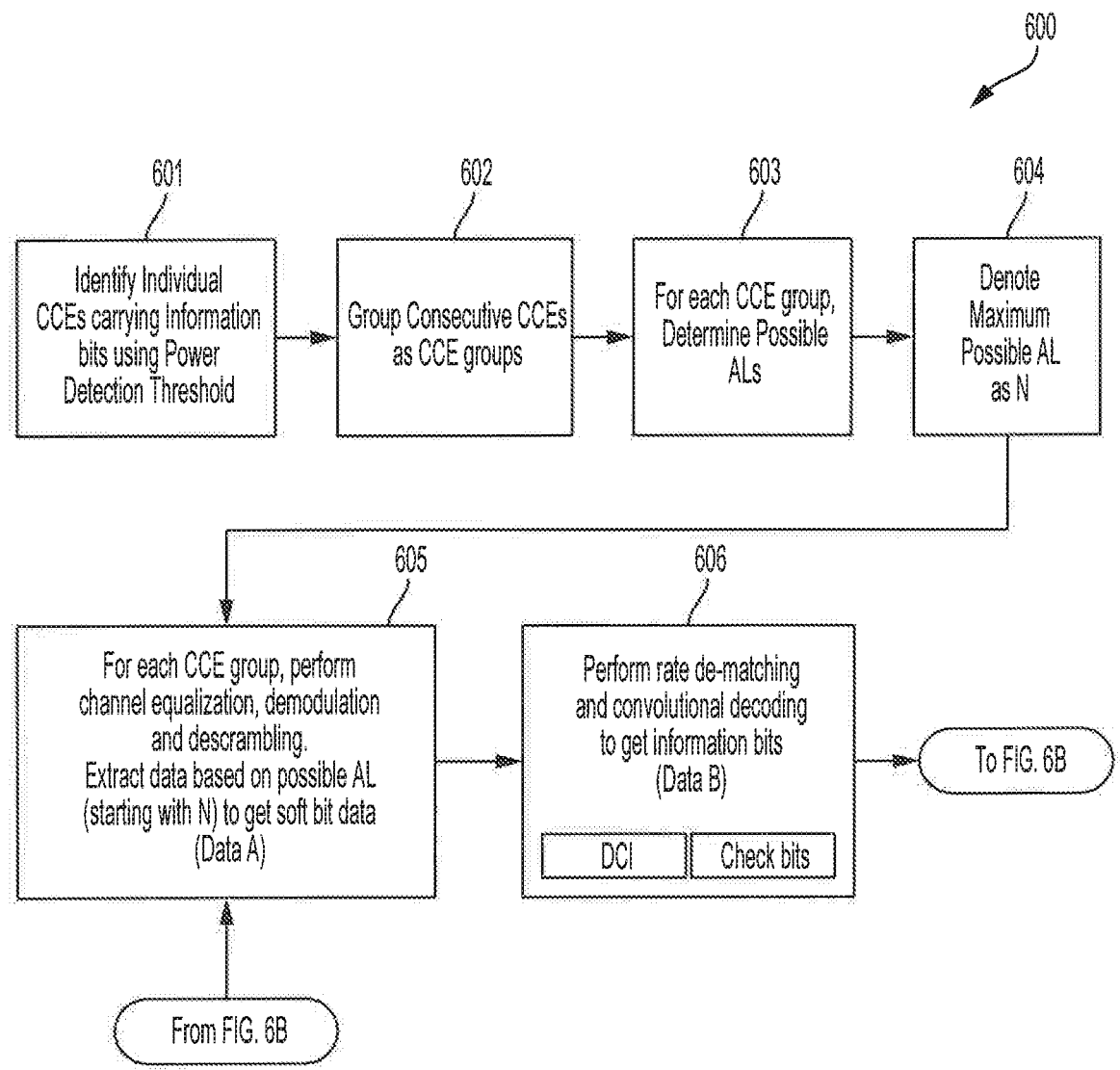
FIGS. 6A and 6B show an exemplary flow diagram of operation of a USII decoder using power detection to identify individual channel elements carrying information bits in combination with redundancy reduction-based error checking for implementing decoding when station identifier information is unknown according to embodiments of the present invention.
Figure 6B:
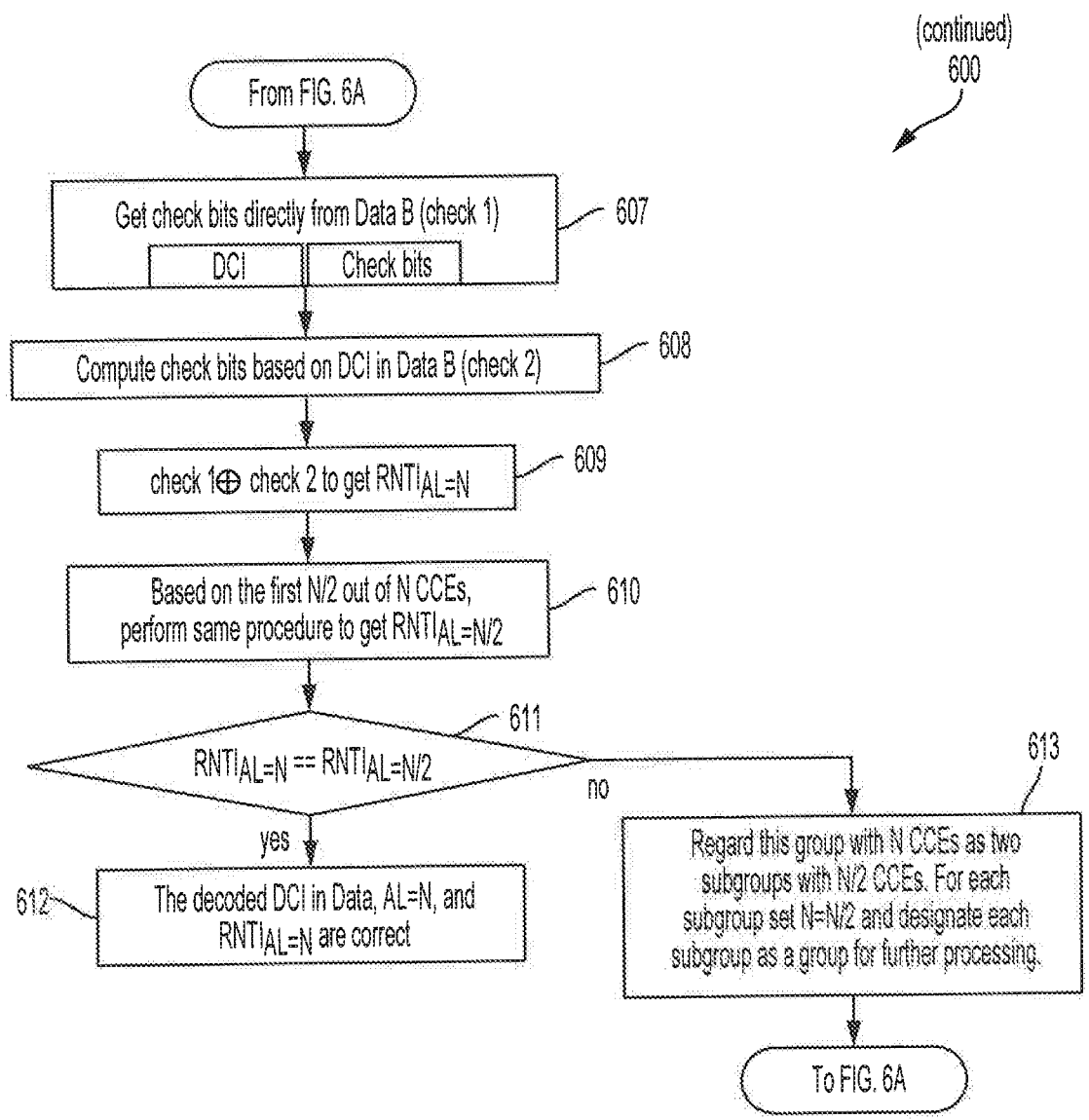

A TE may utilize a USII decoder configuration in accordance with concepts of the present invention in its receiver as a PDCCH decoding mechanism facilitating correctly obtaining DCI and RNTI in unknown RNTI scenarios, such as that described above. FIGS. 6A and 6B show exemplary flow 600 setting forth operation of an embodiment of USII decoder 311 using power detection for identifying candidate control channel data blocks of PDCCH and using redundancy reduction-based error checking for obtaining DCI and RNTI therefrom.

In operation according to the illustrated embodiment of flow 600, power detection is used at block 601 of FIG. 6A to identify individual CCEs for PDCCH carrying information bits since CCE is the resource unit of PDCCH. For example, logic of USII decoder 311 may analyze subframes in the control region of a received channel signal to detect individual CCEs using power detection techniques. In operation of a 4G cellular network system, as a specific example, all CCEs for PDCCH are within the first 1/2/3/4 orthogonal frequency-division multiplexing (OFDM) symbols of every sub-frame, wherein the number of OFDM symbols containing PDCCH is carried in the physical control format indicator channel (PCFICH). Accordingly, receiver 310 may decode the PCFICH channel to obtain the number of control OFDM symbols for use in determining the CCEs for PDCCH. Irrespective of the particular way in which CCEs for PDCCH are determined, in operation according to embodiments, a CCE for PDCCH may be considered as carrying information bits if the CCE average power meets or exceeds a predetermined threshold value. As a specific example, logic of USII decoder 311 may compute the average power across all the CCEs for PDCCH and denote this as threshold power Th. In operation according to this example, a CCE is considered to carry information if the average power of the CCE under consideration ($CCE_{AVG(i)}$) is greater than or equal to the average power across all the CCEs for PDCCH plus some difference factor $\Delta$ (i.e., $CCE_{AVG(i)} \geq Th+\Delta$), wherein the difference factor $\Delta$ of embodiments is configurable to maximize system flexibility (e.g., the value of difference factor $\Delta$ may be determined using analysis of empirical results, simulation, etc.). As a non-limiting example, the value of difference factor $\Delta$ may be 0.1*Th in a typical 4G cellular network system configuration. Such operation to identify individual CCEs carrying information bits is illustrated in the upper graph shown in FIG. 7.

Figure 7:
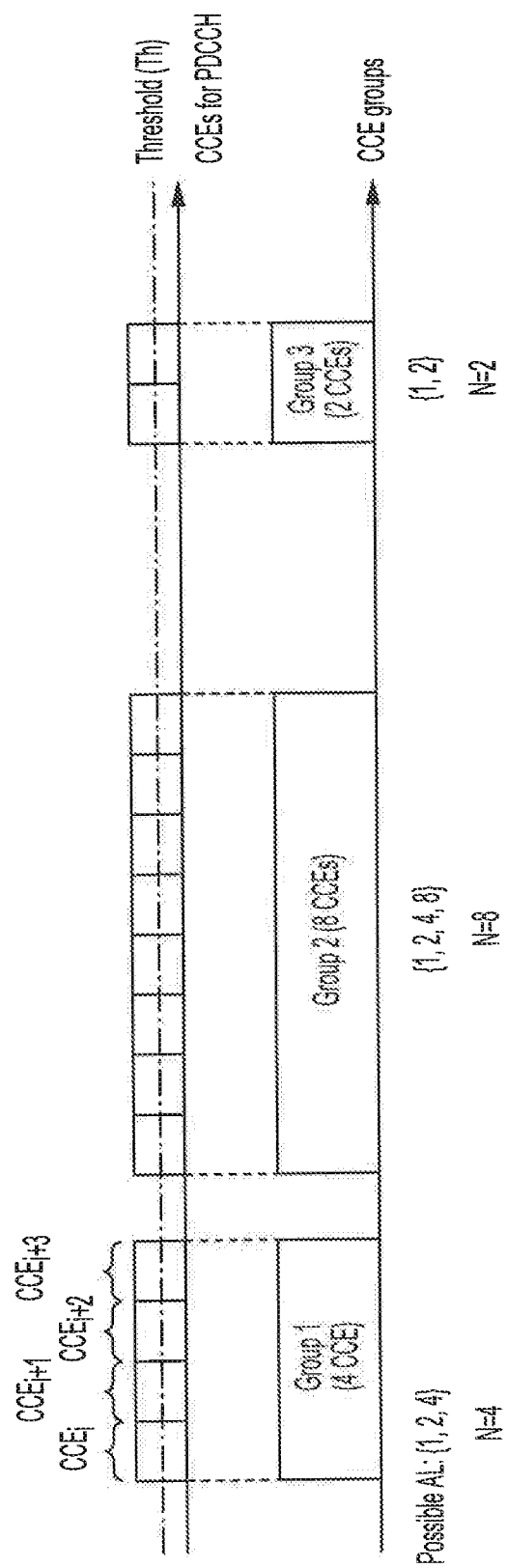
FIG. 7 shows operation to identify individual CCEs carrying information bits and grouping consecutive ones of the CCEs identified as carrying information bits according to embodiments of the present invention.

Instances of individual CCEs identified as carrying information bits are grouped at block 602. For example, consecutive ones of the CCEs identified as carrying information bits are grouped as CCE groups, as illustrated in the lower graph FIG. 7 showing exemplary CCE Group 1, CCE Group 2, and CCE Group 3.

At block 604 of the illustrated embodiment of flow 600, the possible ALs for each CCE group are determined, and the maximum possible AL is denoted as N for use in redundancy reduction-based error checking operation. Denoting the maximum possible AL for example CCE Groups is shown in FIG. 7, wherein the possible ALs for CCE Group 1 are 1, 2, and 4 and the maximum possible AL is 4 (N=4), the possible ALs for CCE Group 2 are 1, 2, 4, and 8 and the maximum possible AL is 8 (N=8), and the possible ALs for CCE Group 3 are 1 and 2 and the maximum possible AL is 2 (N=2).

In operation according to embodiments of USII decoder 311, the functions of blocks 605-613 are performed with respect to each of the CCE groups for obtaining RNTI and decoding DCI from any of the possible PDCCHs in the CCE groups. Accordingly, although not explicitly shown in the illustrated flow for simplifying the drawing, processing according to blocks 605-613 may be repeated (or performed in parallel) for each of the CCE groups. Moreover, as will be better understood from the discussion that follows, processing according to blocks 605-613 may be repeated for CCE groups designated from subgroups of CCE groups of a prior iteration.

Decoding is performed with all possible AL(s) for each CCE group to obtain decoded information bits at blocks 605 and 606. The decoding is preferably performed for each possible AL, starting with the maximum possible AL (N). In performing decoding according to embodiments, soft bit data (Data A) is extracted from each possible AL of a CCE group by performing channel equalization, demodulation, and descrambling to extract data based on each possible AL (block 605). Thereafter, rate de-matching and convolutional decoding may be performed on the soft bit data to obtain information bits (Data B) from each AL in the CCE group (block 606). In this PDCCH example, the information bits comprise putative DCI and check bits.

Blocks 607-613 of the illustrated embodiment of flow 600 shown in FIG. 6B provide redundancy reduction-based error checking operation according to concepts of the present invention. Redundancy reduction-based error checking implemented according to embodiments of the invention performs error checking between data decoded from a CCE group comprising a candidate PDCCH (e.g., CCE group AL=N) that contains redundant data and a portion of that CCE group (e.g., CCE group AL=N/2) that contains redundancy reduced data. In operation according to the flow of blocks 607-613, for each CCE group, RNTIs with AL=N (blocks 607-609) and AL=N/2 (block 610) are obtained and $RNTI_{AL=N}$ compared with $RNTI_{AL=N/2}$ to determine if the decoded DCI is correct. As a specific example, the CCE group under consideration in a particular iteration of blocks 607-613 may be CCE Group 2 of FIG. 7 having 8 CCEs and a maximum AL of 8 (N=8). In this example, $RNTI_{AL=N}$ is obtained from 8 consecutive (N=8) CCEs (e.g., the first 8 CCEs) of Group 2, while $RNTI_{AL=N/2}$ is obtained from 4 consecutive (N=8/2=4) CCEs (e.g., the first 4 CCEs) of Group 2 with N=8.

In obtaining RNTIs with AL=N for redundancy reduction-based error checking operation according to the illustrated embodiment, at block 607 a first set of check bits (Check $1_{AL=N}$) is obtained directly from the information bits (Data B) previously obtained for AL=N of the CCE group. Thereafter, at block 608, a second set of check bits (Check $2_{AL=N}$) is computed based on the DCI from the information bits (Data B) previously obtained for AL=N of the CCE group. The putative RNTI for AL=N ($RNTI_{AL=N}$) is determined at block 609 by comparing the first and second sets of check bits. For example, XOR logic may be used to compare the first and second sets of check bits in obtaining the RNTI (e.g., Check $1_{AL=N} \oplus$ Check $2_{AL=N} = RNTI_{AL=N}$).

Correspondingly, obtaining RNTIs with AL=N/2 for redundancy reduction-based error checking operation according to the illustrated embodiment performs operations to obtain and compare sets of check bits, although the check bits are obtained from the information bits (Data B) previously obtained for the CCE group subset for AL=N/2. Accordingly, at block 610 of flow 600 illustrated in FIG. 6B perform functions corresponding to those of blocks 607-610 above, albeit with respect to AL=N/2. For example, at block 610 a first set of check bits (Check $1_{AL=N/2}$) is obtained directly from the information bits (Data B) previously obtained for AL=N/2 of the CCE group. Thereafter, a second set of check bits (Check $2_{AL=N/2}$) is computed based on the DCI from the information bits (Data B) previously obtained for AL=N/2 of the CCE group. The putative RNTI for AL=N/2 ($RNTI_{AL=N/2}$) is determined by comparing the first and second sets of check bits. For example, XOR logic may be used to compare the first and second sets of check bits in obtaining the RNTI (e.g., Check $1_{AL=N/2} \oplus$ Check $2_{AL=N/2} = RNTI_{AL=N/2}$).

Having obtained RNTIs (e.g., $RNTI_{AL=N}$ and $RNTI_{AL=N/2}$) from both data decoded from a CCE group comprising a candidate PDCCH (e.g., CCE group AL=N) that contains redundant data and a portion of that CCE group (e.g., CCE group AL=N/2) that contains redundancy reduced data, error checking is performed according to embodiments of the invention to determine if the decoded DCI and RNTI for the CCE group AL=N are correct. Accordingly, at block 611 of the illustrated embodiment of flow 600 the RNTIs are compared, such as to determine if $RNTI_{AL=N}$ exactly equals $RNTI_{AL=N/2}$ (i.e., $RNTI_{AL=N} = RNTI_{AL=N/2}$).

If the comparison of the RNTIs is favorable (e.g., $RNTI_{AL=N} = RNTI_{AL=N/2}$), processing according to the illustrated embodiment proceeds to block 612. At block 612 it is determined that the decoded DCI and RNTI for AL=N of the CCE group are correct, and thus may be passed to other functional blocks of the TE for further processing and/or use (e.g., detection of the corresponding UE by a V2X system or security system node for reporting presence and/or other information to a corresponding server).

If, however, the comparison of the RNTIs is not favorable (e.g., $RNTI_{AL=N} \neq RNTI_{AL=N/2}$), processing according to the illustrated embodiment proceeds to block 613. At block 613 it is determined that the decoded DCI and RNTI for AL=N of the CCE group are not correct, and thus further processing with respect to the CCE group may be performed in an effort to correctly decode DCI and RNTI. For example, in accordance with the illustrated embodiment, the CCE group may be regarded as comprising two subgroups each having N/2 CCEs. Each such subgroup may be processed as a CCE group in accordance with the foregoing. For example, for each subgroup N may be set as N/2 from the CCE group in which they were included (i.e., $N_{subgroup} = N_{CCEgroup}/2$). Processing may thus return to block 605 for processing of these subgroups as CCE groups.

It can be appreciated from the foregoing, that USII decoding using redundancy reduction-based error checking in accordance with concepts herein may be utilized in PDCCH decoding. Embodiments may operate to obtain the control channel elements CCEs for PDCCH which carry information through power detection and group consecutive detected CCEs into one group. Redundancy reduction-based error checking operation may determine, for each CCE group, possible ALs based on the CCE group size, and denote N as the maximum possible AL. Thereafter, the redundancy reduction-based error checking operation may obtain the decoded data for each CCE group with AL=N and possible DCI, through demodulation, descrambling, rate de-matching, and decoding, and obtain $RNTI_{AL=N}$ from the decoded data. Similarly, the redundancy reduction-based error checking operation may obtain the decoded data from the first N/2 CCEs of the same CCE group with AL=N/2 and same DCI, through demodulation, descrambling, rate de-matching, and decoding, and obtain $RNTI_{AL=N/2}$ from the decoded data. $RNTI_{AL=N}$ and $RNTI_{AL=N/2}$ may be obtained, for example, by getting first check bits directly from the respective decoded data, deriving second check bits from the DCI bits in the respective decoded data, and obtaining $RNTI_{AL=N}$ or $RNTI_{AL=N/2}$ from an exclusive or operation with respect to their respective first and second check bits (e.g., check 1 XOR check 2). Redundancy reduction-based error checking may operate to determine whether $RNTI_{AL=N}$ and $RNTI_{AL=N/2}$ are equal and, if $RNTI_{AL=N}$ is equal to $RNTI_{AL=N/2}$ concluding that the decoded DCI and RNTI are correct, but if $RNTI_{AL=N}$ is not equal to $RNTI_{AL=N/2}$ concluding that this RNTI is incorrect and regarding this CCE group with AL=N as two CCE groups with AL=N/2, and repeating the decoding and determining steps with maximum AL=N/2.

For example, in the case of $RNTI_{AL=N} \neq RNTI_{AL=N/2}$ with original CCE group can be regarded as two CCE sub-groups, for each subgroup of N/2 consecutive CCEs the redundancy reduction-based error checking operation may denote the first CCE sub-group and second CCE sub-group as $G_1$ and $G_2$, respectively. Thereafter, the redundancy reduction-based error checking operation may obtain $RNTI_{AL=N/2}^{G2}$ from decoding $G_2$, and $RNTI_{AL=N/2}^{G1} = RNTI_{AL=N/2}$. The redundancy reduction-based error checking operation, denoting the first and second N/4 (N≥4) consecutive CCEs in $G_1$ as $g_1$, $g_2$, respectively and denoting the first and second N/4 consecutive CCEs in $G_2$ as $g_3$, $g_4$, respectively, may obtain $RNTI_{AL=N/4}^{g1}$ from decoding $g_1$ and obtain $RNTI_{AL=N/4}^{g3}$ from decoding $g_3$. Redundancy reduction-based error checking may operate to compare $RNTI_{AL=N/2}^{G1}$ with $RNTI_{AL=N/4}^{g1}$, and $RNTI_{AL=N/2}^{G2}$ with $RNTI_{AL=N/4}^{g3}$. If $RNTI_{AL=N/2}^{G1}=RNTI_{AL=N/4}^{g1}$, then the redundancy reduction-based error checking operation may determine that AL=4, $RNTI_{AL=N/2}^{G1}$ and its corresponding DCI are correct. Similarly, if $RNTI_{AL=N/2}^{G2}=RNTI_{AL=N/4}^{g3}$, then the redundancy reduction-based error checking operation may determine that AL=4, $RNTI_{AL=N/2}^{G2}$ and its corresponding DCI are correct. Otherwise, the redundancy reduction-based error checking operation may again determine that RNTI is incorrect and regard the respective CCE group as two CCE groups with AL=N/2, repeating the decoding and determining steps with maximum AL=N/2.

Figure 8B:
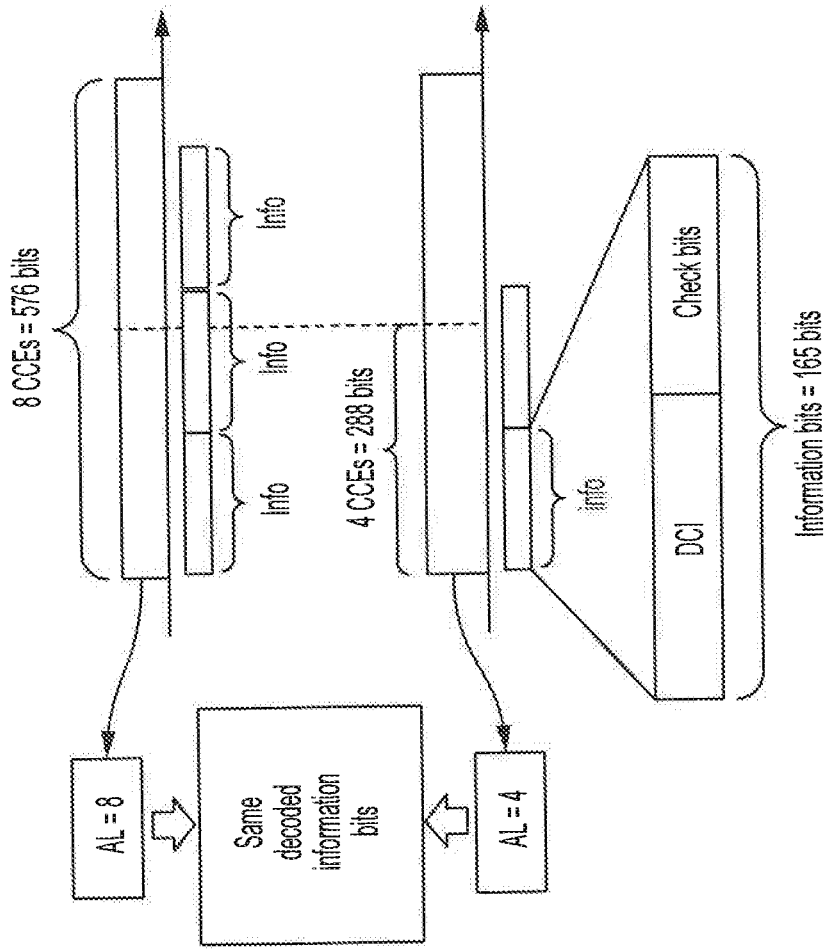
FIGS. 8A and 8B show application of redundancy reduction-based error checking in accordance with embodiments of the present invention for an example where the CCE group comprises 8 CCEs.
Figure 8A:
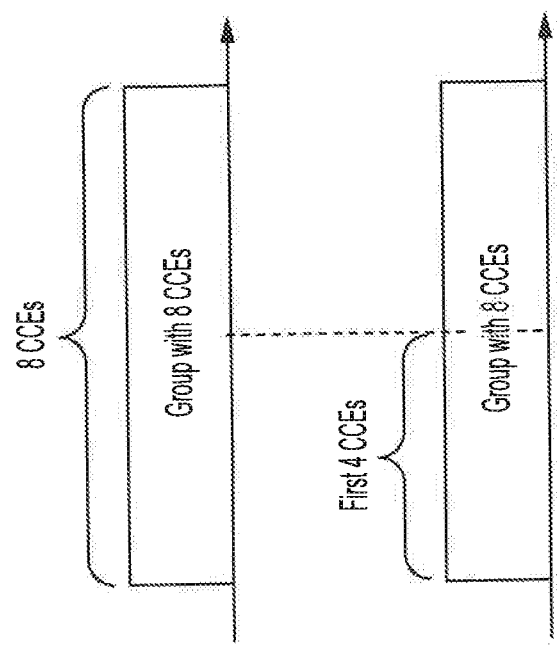

The illustrations of FIGS. 8A and 8B and the table below aid in understanding why the decoded DCI can be determined as correct if $RNTI_{AL=N}==RNTI_{AL=N/2}$ using redundancy reduction-based error checking of embodiments of a USII decoder. In the example illustrated, a CCE group (e.g., CCE Group 2 of FIG. 7) having 8 CCEs and a maximum AL of 8 (N=8) (e.g., CCE Group 2 of FIG. 7) includes two subgroups of 4 CCEs (N=8/2=4). As can be seen from the table below, for DCI format 1 and bandwidth=20 MHz, the DCI length=39 bits, the length of check bits=16 bits, and the rate of tail-biting encoding=⅓, and thus the total length of information bits (DCI and check bits)=(39+16)*3=165 bits. With AL=8, number of information instances=3 (i.e., the information repeats 3 times) in the 8 CCE group. At least one complete instance of the information is present in the first 4 CCEs of the 8 CCE group. Specifically, in the example for DCI format 1 and bandwidth=20 MHz, the DCI length=39 bits, the number of information instances=1 (i.e., the information for AL=N/2 is redundancy reduced with respect to the information for AL=N, but is nevertheless complete). Accordingly, $RNTI_{AL=N}$ may be obtained from 8 consecutive (N=8) CCEs (e.g., the first 8 CCEs) of the CCE group, $RNTI_{AL=N/2}$ may be obtained from 4 consecutive (N=8/2=4) CCEs (e.g., the first 4 CCEs) of the CCE group, and if the information decoded from the 8 consecutive CCEs is decoded correctly it should match the information decoded from the subgroup of the first 4 consecutive CCEs of the CCE group (e.g., $RNTI_{AL=N}==RNTI_{AL=N/2}$).

In accordance with embodiments of the invention, the starting positions of the first N/2 CCEs and the information bits are aligned. Accordingly, the first N/2 CCEs contain complete information bits with known starting position. The starting positions of the last N/2 CCEs and the information bits may, however, not be aligned and additional signal processing may be utilized to extract, re-order, and combine the information bits contained in the last N/2 CCEs for redundancy reduction-based error checking operation.

It should be understood from the discussion above that redundancy reduction-based error checking CCE groups with higher AL (i.e., large number of CCEs) may contain multiple repeated information bits, wherein information bits obtained from decoding a CCE group with maximum possible AL (N) can be the same as the information bits obtained from decoding the first N/2 CCEs of the same CCE group with AL=N/2. Thus, the redundancy in the CCE group with higher AL can be utilized to double-check the correctness of the decoded information bits. It should also be understood that for the redundancy reduction-based error checking CCE group with N CCEs, the first N/2 CCEs and last N/2 CCEs may carry different information (e.g., different DCIs for different users), instead of carrying same information repeatedly. If the first N/2 CCEs carry info 1 and the last N/2 CCEs carry info 2, for example, the derived data from decoding N consecutive CCEs is not info 1, but info 1 interfered with info 2, while the decoded data from the first N/2 CCEs is info 1 and thus the different decoded data lead to $RNTI_{AL=N} \neq RNTI_{AL=N/2}$.

It can be appreciated from the table below that higher ALs and less information bits lead to more repetitions of the information. The redundancy reduction-based error checking of embodiments of USII decoders may be utilized in any case in which sufficient information repetition is provided to include at least one instance of the information in the CCEs of an N/2 CCE subgroup of a N CCE group. Accordingly, embodiments of USII decoders are well suited for use with respect to higher AL cases (e.g., AL=2,4,8).

| DCI | Bandwidth (MHz) | Length of Information (DCI + check bits) | Number of Complete Information Repetition | | |
|---|---|---|---|---|---|
| | | | AL = 8 (576 bits) | AL = 4 (288 bits) | AL = 2 (144 bits) |
| 1 | 20 | 165 bits (max) | 3 | 1 | — |
| | 1.4 | 105 bits (min) | 5 | 2 | 1 |
| 1A | 20 | 132 bits (max) | 4 | 2 | 1 |
| | 1.4 | 111 bits (min) | 5 | 2 | 1 |

Figure 9A:
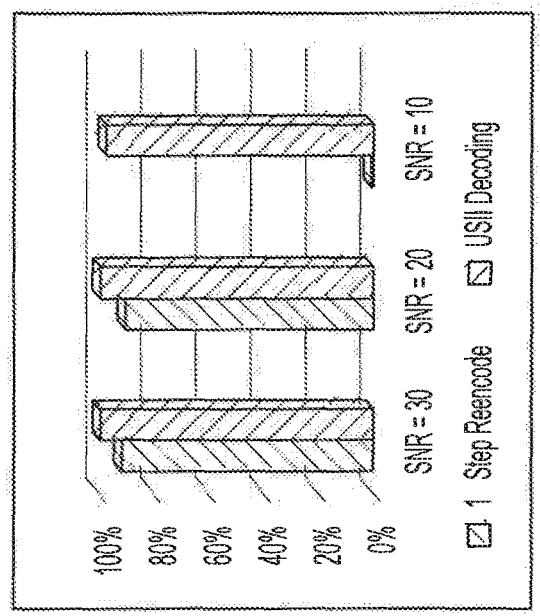
FIGS. 9A-9C show graphs of simulation results comparing redundancy reduction-based error checking of embodiments of the present invention to a relaxed one-step reencode method.
Figure 9B:
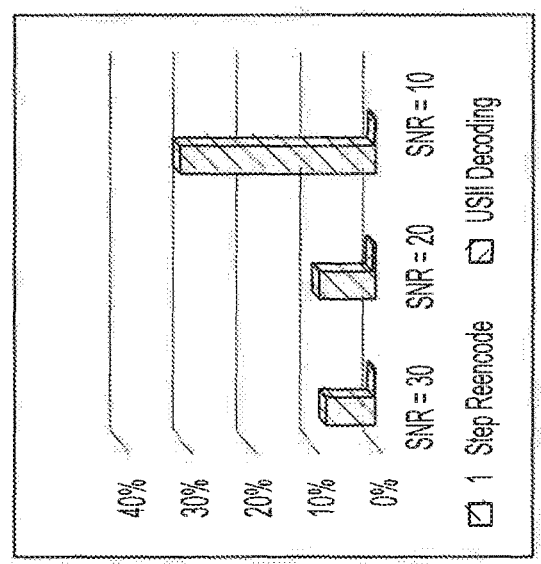
Figure 9C:
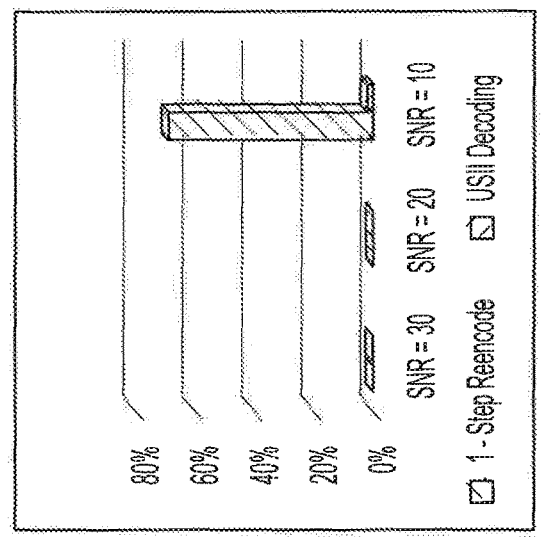

Simulations were performed to compare results from operation of an embodiment of a USII decoder using a redundancy reduction-based error checking method in accordance with an example above and a relaxed one-step reencode method as described above. As can be seen from the results shown in the table below and the corresponding graphs of FIGS. 9A-9C, the simulated redundancy reduction-based error checking provided correct detection probability ≥98%, false alarm probability ≤0.5%, and misdetection probability ≤2%. It can be readily appreciated that the redundancy reduction-based error checking results provide an improvement over relaxed one-step reencode, particularly with respect to low SNR conditions.

| | Adaptive White Gaussian Noise (AWGN) Channel | | | | | |
|---|---|---|---|---|---|---|
| | Correct Detection | | False Alarm | | Miss-detection | |
| SNR (dB) | 1-step Reencode | USII Decoding | 1-step Reencode | USII Decoding | 1-step Reencode | USII Decoding |
| 30 | 92% | 100% | 8% | 0% | 0% | 0% |
| 20 | 91% | 99.5% | 9% | 0.5% | 0% | 0% |
| 10 | 1% | 98% | 31% | 0% | 68% | 2% |

Exemplary embodiments of the invention have been described above with reference to 4G cellular network systems. It should be appreciated, however, that concepts of the present invention may be applied for use with respect to various other network system configurations, such as fifth generation (5G) new radio (NR) cellular network systems, vehicle-to-everything (V2X) network systems, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for decoding a received channel signal when station identifier information is unknown, the method comprising:
    decoding data from a candidate control channel data block containing redundant data;
    decoding data from a portion of the candidate control channel data block containing redundancy reduced data; and
    comparing first information derived from the data decoded from the candidate control channel data block containing redundant data and second information derived from the data decoded from the portion of the candidate control channel data block containing redundancy reduced data.

2. The method of claim 1, wherein the candidate control channel data block containing redundant data comprises a group of a plurality of channel elements of the received channel signal, and the portion of the candidate control channel data block containing redundancy reduced data comprises a subgroup of one or more channel elements of the plurality of channel elements of the received channel signal.

3. The method of claim 2, further comprising:
    determining, for the group of the plurality of channel elements, possible aggregation levels (ALs) based on a channel element group size, wherein a channel element group size of the group of the plurality of channel elements is N and a channel element group size of the subgroup of one or more channel elements is N/2.

4. The method of claim 3, wherein the group of the plurality of channel elements having channel element group size N contains multiple repeated information bits forming the redundant data, wherein the subgroup of one or more channel elements having channel element group size N/2 contains at least one instance of the information bits forming the redundancy reduced data.

5. The method of claim 2, wherein the received channel signal comprises a physical downlink control channel (PDCCH), wherein the channel elements comprise control channel elements (CCEs), wherein the candidate control channel data block comprises a putative PDCCH comprising the CCEs, and wherein the data decoded from the candidate control channel data block containing redundant data and the data decoded from the portion of the candidate control channel data block containing redundancy reduced data comprise downlink control information (DCI).

6. The method of claim 5, further comprising:
    obtaining the first information from check bits computed from the data decoded from the candidate control channel data block containing redundant data, wherein the first information is radio network temporary identifier (RNTI) information for N channel elements of the group of the plurality of channel elements ($RNTI_{AL=N}$); and
    obtaining the second information from check bits computed from the data decoded from the portion of the candidate control channel data block containing redundancy reduced data, wherein the second information is RNTI information for N/2 channel elements of the group of the plurality of channel elements ($RNTI_{AL=N/2}$).

7. The method of claim 6, wherein the obtaining the first information ($RNTI_{AL=N}$) comprises:
    obtaining first check bits (Check 1) directly from the data decoded from the candidate control channel data block containing redundant data;
    obtaining second check bits (Check 2) from DCI bits from the data decoded from the candidate control channel data block containing redundant data; and
    obtaining $RNTI_{AL=N}$ from applying XOR logic with respect to the first check bits and the second check bits (Check 1 XOR Check 2).

8. The method of claim 6, wherein the comparing the first information and the second information comprises:
    determining if $RNTI_{AL=N}$ equals $RNTI_{AL=N/2}$.

9. The method of claim 8, further comprising:
    if it is determined that $RNTI_{AL=N}$ equals $RNTI_{AL=N/2}$, indicating that the $RNTI_{AL=N}$ and the DCI obtained from the candidate control channel data block containing redundant data are correct.

10. The method of claim 8, further comprising:
    if it is determined that $RNTI_{AL=N}$ does not equal $RNTI_{AL=N/2}$, designating the subgroup of one or more channel elements a candidate control channel data block for a putative PDCCH comprising the one or more CCEs of the CCEs and performing the decoding data steps and the comparing step with respect to the candidate control channel data block for the putative PDCCH comprising the one or more CCEs of the CCEs.

11. The method of claim 1, further comprising:
    identifying individual channel elements which carry information through power detection; and
    grouping consecutive ones of the individual channel elements identified into a plurality of groups, wherein the plurality of groups includes a group comprising the candidate control channel data block.

12. The method of claim 11, wherein the power detection comprises:
    computing an average power (Th) across channel elements for the received channel signal; and
    computing an average power ($channel\_element_{AVG}$) for a channel element instance, wherein the channel element instance is considered to carry information if the average power for the channel element instance is greater than or equal to the average power (Th) and a configurable difference factor ($\Delta$) (channel_element$_{AVG}\geq$Th+$\Delta$).

13. A system for decoding a received channel signal when station identifier information is unknown, the system comprising:
a receiver configured to receive channel signals, wherein the channel signals include control channel data blocks of a control channel; and
a decoder configured for decoding control channel data blocks of the control channel when station identifier information used in coding the control channel data blocks are unknown, wherein the decoder includes logic executable by a processor of the decoder to decode data from a candidate control channel data block of a received channel signal containing redundant data, to decode data from a portion of the candidate control channel data block containing redundancy reduced data, and to compare first information derived from the data decoded from the candidate control channel data block containing redundant data and second information derived from the data decoded from the portion of the candidate control channel data block containing redundancy reduced data.

14. The system of claim 13, wherein the candidate control channel data block containing redundant data comprises a group of a plurality of channel elements of the received channel signal, and the portion of the candidate control channel data block containing redundancy reduced data comprises a subgroup of one or more channel elements of the plurality of channel elements of the received channel signal.

15. The system of claim 14, wherein the decoder includes logic executable by the processor to determine, for the group of the plurality of channel elements, possible aggregation levels (ALs) based on a channel element group size, wherein a channel element group size of the group of the plurality of channel elements is N and a channel element group size of the subgroup of one or more channel elements is N/2.

16. The system of claim 15, wherein the group of the plurality of channel elements having channel element group size N contains multiple repeated information bits forming the redundant data, wherein the subgroup of one or more channel elements having channel element group size N/2 contains at least one instance of the information bits forming the redundancy reduced data.

17. The system of claim 14, wherein the received channel signal comprises a physical downlink control channel (PDCCH), wherein the channel elements comprise control channel elements (CCEs), wherein the candidate control channel data block comprises a putative PDCCH comprising the CCEs, and wherein the data decoded from the candidate control channel data block containing redundant data and the data decoded from the portion of the candidate control channel data block containing redundancy reduced data comprise downlink control information (DCI).

18. The system of claim 17, wherein the decoder includes logic executable by the processor to obtain the first information from check bits computed from the data decoded from the candidate control channel data block containing redundant data and to obtain the second information from check bits computed from the data decoded from the portion of the candidate control channel data block containing redundancy reduced data, wherein the first information is radio network temporary identifier (RNTI) information for N channel elements of the group of the plurality of channel elements (RNTI$_{AL=N}$), and wherein the second information is RNTI information for N/2 channel elements of the group of the plurality of channel elements (RNTI$_{AL=N/2}$).

19. The system of claim 18, wherein the decoder includes logic executable by the processor to obtain first check bits (Check 1) directly from the data decoded from the candidate control channel data block containing redundant data, to obtain second check bits (Check 2) from DCI bits from the data decoded from the candidate control channel data block containing redundant data, and obtain RNTI$_{AL=N}$ from applying XOR logic with respect to the first check bits and the second check bits (Check 1 XOR Check 2).

20. The system of claim 18, wherein the logic to compare the first information and the second information determines if RNTI$_{AL=N}$ equals RNTI$_{AL=N/2}$.

21. The system of claim 20, wherein the decoder includes logic executable by the processor to indicate that the RNTI$_{AL=N}$ and the DCI obtained from the candidate control channel data block containing redundant data are correct if it is determined that RNTI$_{AL=N}$ equals RNTI$_{AL=N/2}$.

22. The system of claim 20, wherein the decoder includes logic executable by the processor to designate the subgroup of one or more channel elements a candidate control channel data block for a putative PDCCH comprising the one or more CCEs of the CCEs and to perform decoding data and comparing with respect to the candidate control channel data block for the putative PDCCH comprising the one or more CCEs of the CCEs if it is determined that RNTI$_{AL=N}$ does not equal RNTI$_{AL=N/2}$.

23. The system of claim 13, wherein the decoder includes logic executable by the processor to identify individual channel elements which carry information through power detection and to group consecutive ones of the individual channel elements identified into a plurality of groups, wherein the plurality of groups includes a group comprising the candidate control channel data block.

24. The system of claim 23, wherein the decoder includes logic executable by the processor to compute an average power (Th) across channel elements for the received channel signal and to compute an average power (channel_element$_{AVG}$) for a channel element instance, wherein the channel element instance is considered to carry information if the average power for the channel element instance is greater than or equal to the average power (Th) and a configurable difference factor ($\Delta$) (channel_element$_{AVG}\geq$Th+$\Delta$).

* * * * *